US012025405B2

(12) United States Patent
Perez et al.

(10) Patent No.: US 12,025,405 B2
(45) Date of Patent: Jul. 2, 2024

(54) THERMOPLASTIC CANISTER

(71) Applicant: RAFAEL ADVANCED DEFENSE SYSTEMS LTD., Haifa (IL)

(72) Inventors: Yatir Perez, Beit Shean (IL); Yoav Redlich, Kibutz Gonen (IL); Itai Ben-Zvi, Moshav Ramat Zvi (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 41 days.

(21) Appl. No.: 17/759,507

(22) PCT Filed: Feb. 10, 2021

(86) PCT No.: PCT/IL2021/050159
§ 371 (c)(1),
(2) Date: Jul. 26, 2022

(87) PCT Pub. No.: WO2021/161308
PCT Pub. Date: Aug. 19, 2021

(65) Prior Publication Data
US 2023/0083121 A1 Mar. 16, 2023

(30) Foreign Application Priority Data
Feb. 16, 2020 (IL) .......................................... 272774

(51) Int. Cl.
| F41F 3/045 | (2006.01) |
| F41F 3/077 | (2006.01) |
| B29C 45/00 | (2006.01) |
| B29C 45/14 | (2006.01) |
| B29K 77/00 | (2006.01) |

(Continued)

(52) U.S. Cl.
CPC .............. F41F 3/045 (2013.01); F41F 3/077 (2013.01); *B29C 45/0005* (2013.01); *B29C 2045/0079* (2013.01); *B29C 45/14622* (2013.01); *B29C 45/14811* (2013.01); *B29K 2077/00* (2013.01); *B29K 2307/04* (2013.01); *B29K 2705/02* (2013.01); *B29L 2031/7772* (2013.01)

(58) Field of Classification Search
CPC ....... F41F 3/045; F41F 3/077; B29C 45/0005; B29C 45/14622; B29C 45/14811; B29C 2045/0079; B29K 2077/0079; B29K 2307/04; B29K 2705/02
USPC .......................................... 89/1.815
See application file for complete search history.

(56) References Cited

U.S. PATENT DOCUMENTS 5,115,711 A * 5/1992 Bushagour .............. F41F 3/042
89/1.816
6,460,694 B1 * 10/2002 Khanna ................... F42B 39/00
229/93

(Continued)

FOREIGN PATENT DOCUMENTS

CN 109323622 A 2/2019

OTHER PUBLICATIONS

PCT International Search Report and Written Opinion, PCT Application No. PCT/IL2021/050159, Apr. 13, 2021, 7 pages.

*Primary Examiner* — John Cooper
(74) *Attorney, Agent, or Firm* — Fenwick & West LLP; Daniel R. Brownstone (57) ABSTRACT

A canister for storing and launching a self-propelled projectile comprises: a) an inner layer comprising an aluminum foil; b) a top layer consisting of an injected thermoplastic polymer; and c) optionally, a primer and/or a topcoat.

10 Claims, 7 Drawing Sheets

(51) Int. Cl.
*B29K 307/04* (2006.01)
*B29K 705/02* (2006.01)
*B29L 31/00* (2006.01)

(56) References Cited

U.S. PATENT DOCUMENTS

| | | | |
|---|---|---|---|
| 6,526,860 B2 | 3/2003 | Facciano et al. | |
| 7,601,654 B2 | 10/2009 | Bhatnagar et al. | |
| 8,220,392 B1* | 7/2012 | Maldonado | F42B 30/12 |
| | | | 42/105 |
| 9,939,222 B1* | 4/2018 | Mulligan | B32B 15/20 |
| 10,994,512 B2* | 5/2021 | Daivajna | F16L 9/147 |
| 2007/0293107 A1 | 12/2007 | Follo et al. | |
| 2011/0174639 A1* | 7/2011 | Sibley | F42B 39/26 |
| | | | 53/472 |
| 2016/0265863 A1* | 9/2016 | Lincoln | F41F 1/06 |

* cited by examiner

THERMOPLASTIC CANISTER

FIELD OF THE INVENTION

The present invention relates to a canister for holding and launching missiles. More particularly, the invention relates to a novel canister employing thermoplastic polymers as the structural material.

BACKGROUND OF THE INVENTION

Canisters are used to hold a launchable projectile (referred to hereinafter for simplicity as "missile"), and also serve as protective cages for the missile against severe environmental conditions (storage, drop, vibrations, transportation including pressure). While a great variety of different canisters exist for different missiles, launching platforms, and uses, many of the requirements from said canisters are common to all of them. For instance, the missile must be protected from humidity and, therefore, the proximal end of the canister, from which the missile is ejected, must be properly sealed. Moreover, the canister must not allow passage of electromagnetic interference (EMI), such as radio frequency interference (RFI), which may activate the missile and otherwise interfere with its electronic components. Accordingly, canisters typically have a quite complex structure, including different layers and composite engineering materials, which are both expensive and difficult to process.

One example of such a canister is that described in U.S. Pat. No. 6,526,860, which describes a launch canister for missile, including an outer canister shell and a concentric inner liner that can be constructed from structural load carrying composite material, and also acts as a thermal and ablative insulator. Shock and vibration isolation layer can be laminated between the inner liner and the canister shell. Additionally, a thin aluminum shell is provided is a structural support and also serves as a gas permeability and EMI barrier for the internally housed missile electronics. Construction materials include, for instance, glass-impregnated phenolic composite.

As will be apparent to the skilled person, the durability requirements from the canisters have necessitated the use of expensive materials and complex manufacturing techniques, because the art has so far failed to provide an effective, simple and cost-effective canisters structure. Such durability requirements include, for example:
Temperature range −45 to +70 C.
Withstand drop between 0.9 m to 2.1 m
Transportation vibrations, incl. naval, air or ground transportation, such as 600 km of Gravel/dirt roads
Altitude Up to 40,000 feet in non-pressurized compartment
Storage Period of 20 years.

It is an object of the present invention to provide such a canister, which meets the requirements described above while employing less expensive materials and manufacturing techniques.

It is another object of the invention to provide such a canister that overcomes the drawbacks of the prior art.

It is a further object of the invention to provide a canister that is lightweight while containing the required structural strength.

Other objects and advantages of the invention will become apparent as the description proceeds.

SUMMARY OF THE INVENTION

The invention relates to a canister for storing and launching a self-propelled projectile, comprising:

a) an inner layer comprising an aluminum foil;
b) a top layer consisting of an injected thermoplastic polymer; and
c) optionally, a primer and/or a topcoat.

In one embodiment of the invention the canister further comprises a sealing aluminum membrane soldered at its proximal extremity.

In one embodiment of the invention the aluminum foil is a structure of at least three layers laminate, comprising of at least top and bottom thermoplastic polymer layer, and intermediate aluminum layer.

Illustrative and non-limitative embodiment is one in which the top and bottom layer of the laminate are in 10-100 μm thickness, and the intermediate layer is in the range of 40-280 μm. In another embodiment of the invention the aluminum layer is selected from the 1XXX series aluminum alloys, although of course other alloys can be used and the invention is not limited to any particular alloy.

In another embodiment of the invention the top layer thermoplastic polymer is a polyamide polymer further comprising carbon fibers. Typical content of carbon fibers is 30%-50% by weight of said thermoplastic polymer, but as will be apparent to the skilled person, other proportions can also be employed.

A great variety of thermoplastic polymers exists, which can be used in the context of the invention and, for example, the top layer thermoplastic polymer can be a polyphthalamide polymer including carbon fibers.

As will be apparent to the skilled person, the canister according to the invention may further comprise metal inserts, configured to hold attachable components to said canister, and said inserts can be covered, for instance using cataphoretic coatings.

All the above characteristics and advantages of the invention can be further appreciated through the following detailed description of embodiments thereof, with reference to the appended drawings.

BRIEF DESCRIPTION OF THE DRAWINGS

In the drawings:
FIGS. 1(A and B) schematically shows a launch canister.

DETAILED DESCRIPTION OF THE INVENTION

Figure 1A:
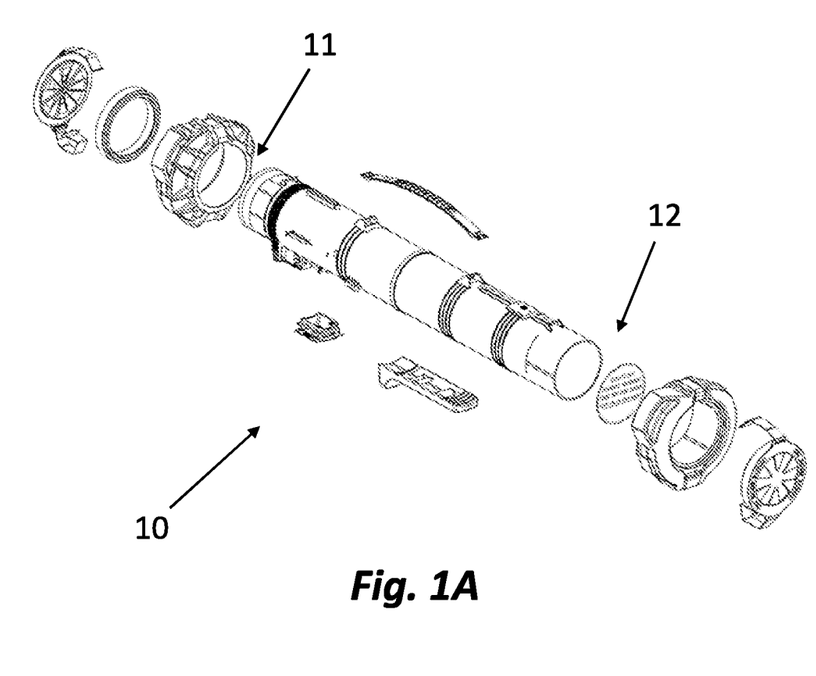
Figure 1B:
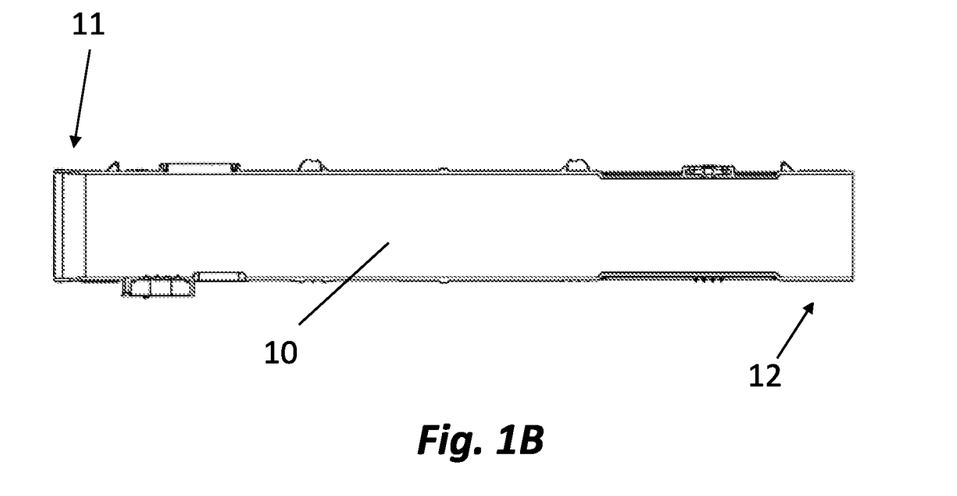
Figure 2A:
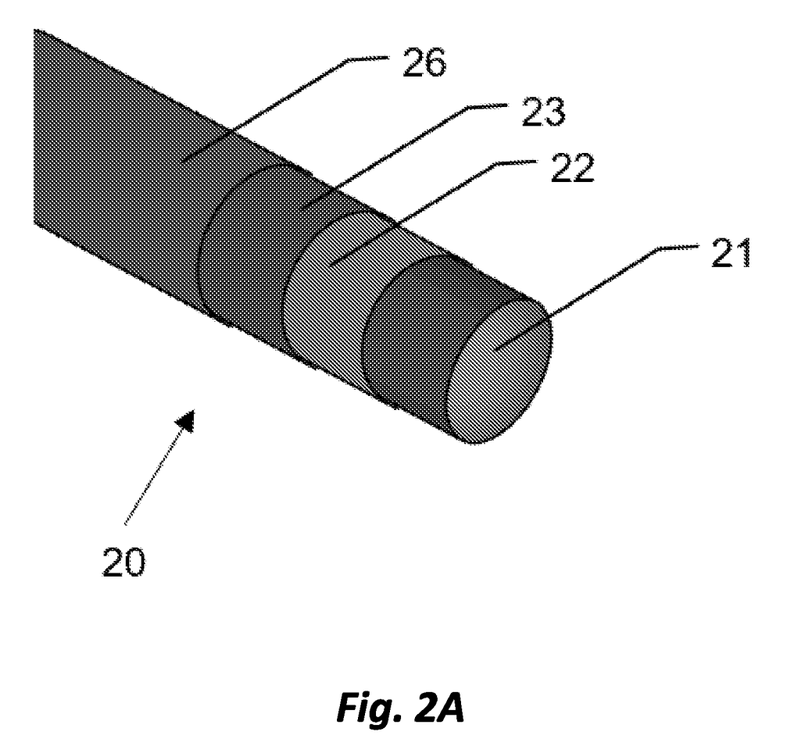
FIG. 2A shows the layers of a segment of canister according to an embodiment of the invention.

FIG. 1A schematically shows a canister with a central, tubular section 10, adapted to house a missile during storage and to launch it therefrom. Tubular section 10 is shown in FIG. 1B in cross-section taken along its central axis. One extremity 12 of the canister is sealed permanently, whereas extremity 11 is the proximal end from which the missile will be ejected, and must allow the missile to be ejected without resistance. FIG. 2A is a view of a segment of the canister during manufacturing, according to one embodiment of the invention, generally indicated by 20. According to this embodiment an injection mold 21 is provided onto which an aluminum foil 22 is wrapped. Also shown in the figure are a thermoplastic layer 23 and a top paint 26.

Figure 2B:
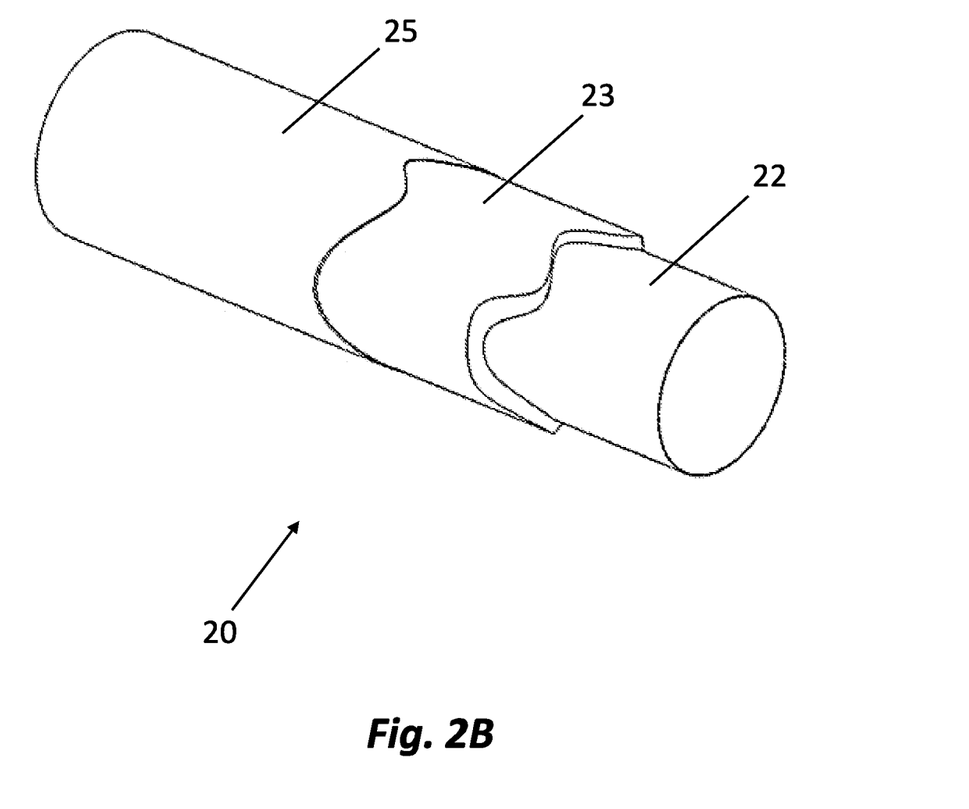
FIG. 2B a segment of a canister after injection, according to an embodiment of the invention.
Figure 2C:
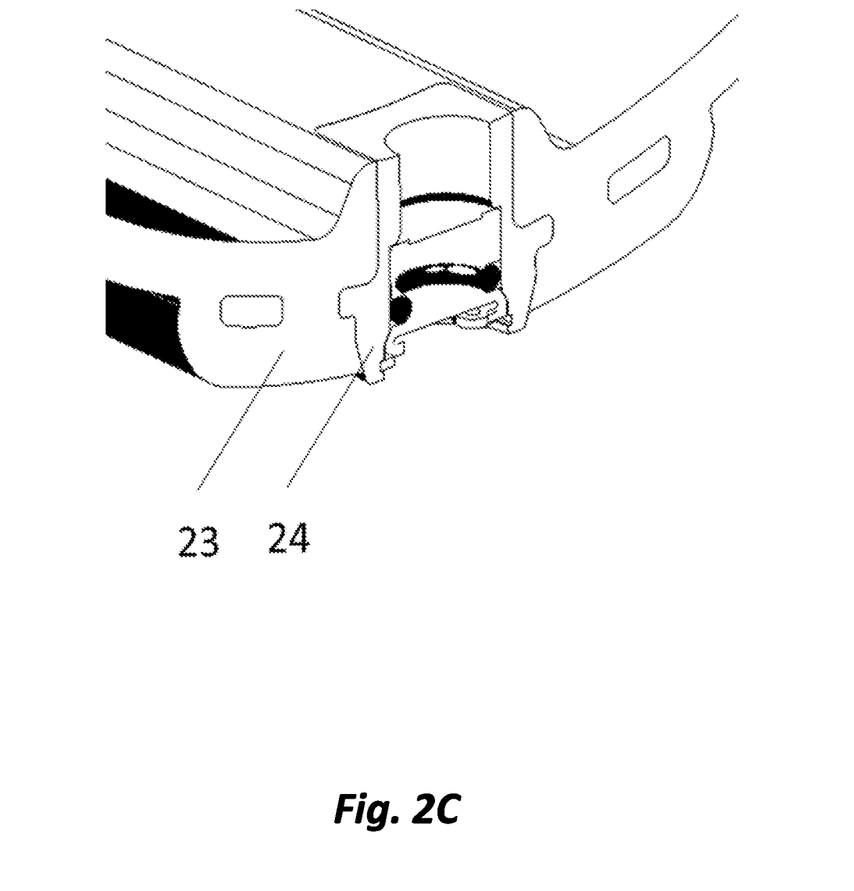
FIG. 2C illustrates in-mold inserts placed into designated cavities in the injection mold in preparation for the injection process.

In preparation for the injection process, in-mold inserts are placed into designated cavities in the injection mold, as shown in FIG. 2C. Once inserts 24 are in place, the thermoplastic polymer layer 23 can be injected thereon. Layer 23 consists of a thermoplastic material. As will be appreciated by the skilled person a great variety of thermoplastic engineering polymers are available on the market, and the invention is not intended to be limited to the use of any specific polymer. Without derogating from the generality of the above, and illustrative example of a suitable thermoplastic polymer is selected from the group of polyamide and polyphtalamide, combined with carbon fibers, result with fiber reinforced polymers structure. This type of polymers is available from a large variety of sources.

Once injection is completed, the resulting canister body is shown in FIG. 2B, illustrating the triple laminate aluminum foil 22, the injected thermoplastic material 23, as well as a topcoat 25, which in one embodiment is added for protective purposes, e.g., against UV, as well as for aesthetic purposes.

Figure 3:
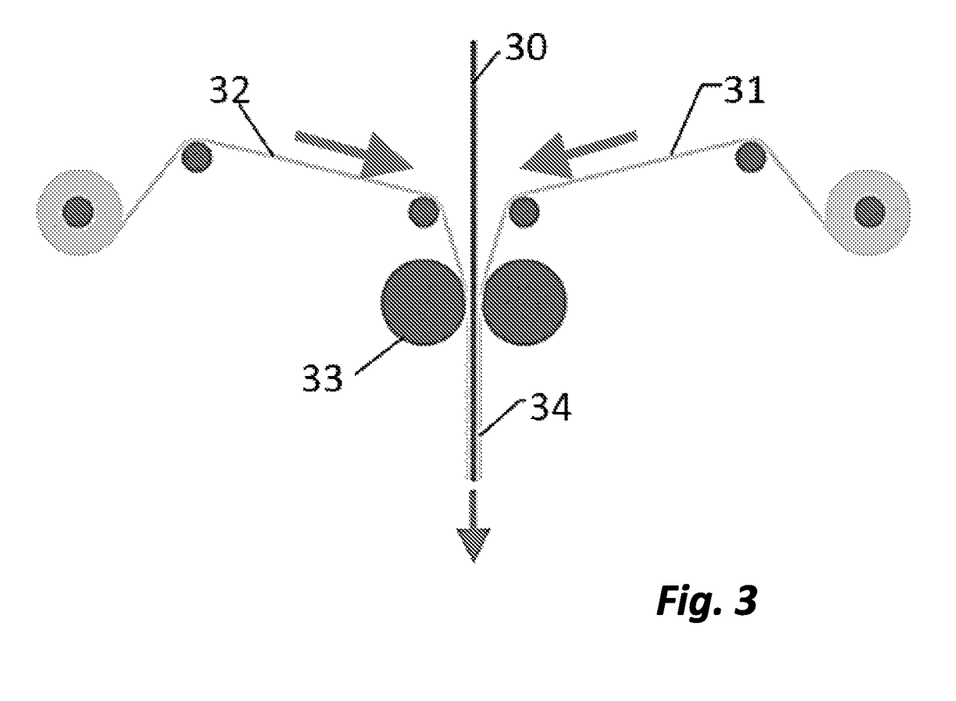
FIG. 3 schematically illustrates a foil lamination process for an aluminum foil.
Figure 4:
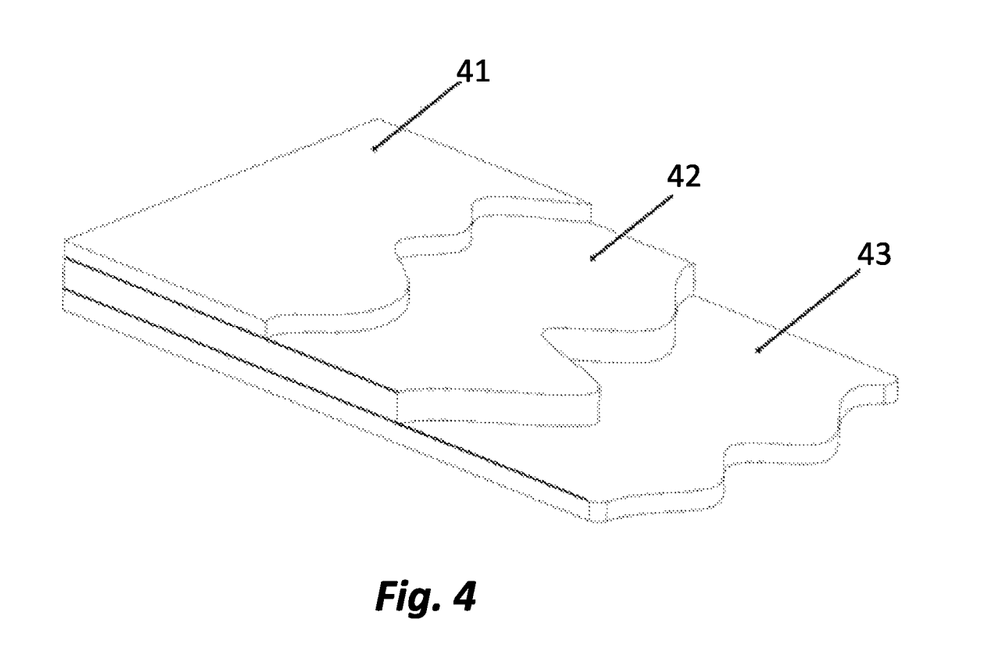
FIG. 4 shows the layers of a laminated aluminum foil according to one embodiment of the invention.

Providing that triple layer laminate can be done using any suitable method. FIG. 3 schematically shows the process of preparation of such laminate, in which a minimum foil 30 is co-fed with thermoplastic layers 31 and 32 to a pair of rollers 33, yielding the triple layer laminate 34. A cross-section of the resulting layer is shown in FIG. 4, for a specific embodiment of the invention. In this particular illustrative example, layers 41, 42, and 43 are 10 to 100 μm polyamide, 20 to 100 μm aluminum, and 10 to 100 μm polyamide, respectively.

Another substantial advantage of the invention is that the proximal end of the canister can be easily sealed by a membrane made of aluminum foil, which may be welded onto the end of the tube once the thermoplastic material has been injected. This is customarily achieved with commercial products, such as dairy product which need to be sealed, also employing an aluminum foil.

Figure 5:
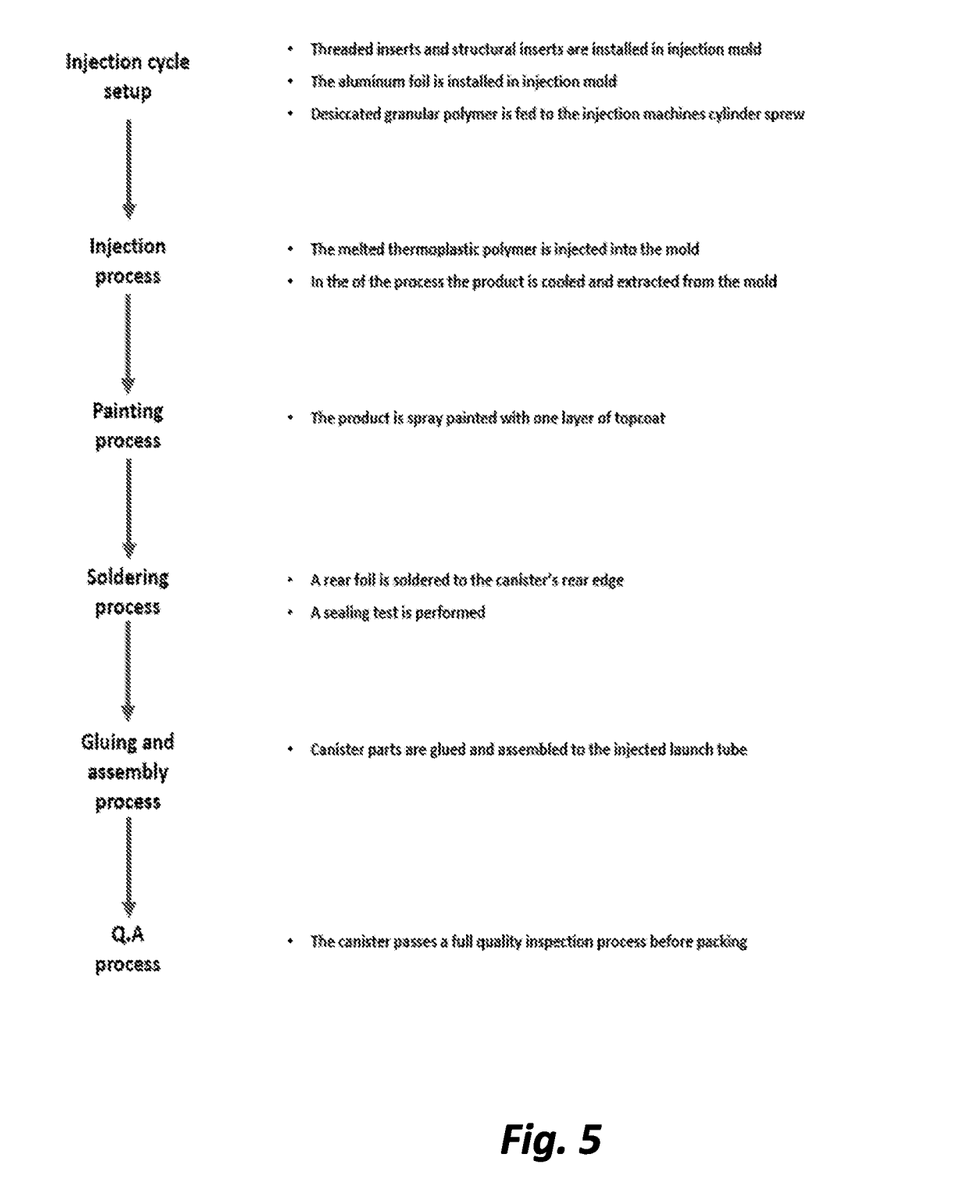
FIG. 5 illustrates the steps of one process suitable to manufacture a canister according to the invention.

The canister of the invention can be conveniently manufactured, for instance using the process detailed in FIG. 5, according to the following steps and sub-steps:

Step 1: Injection cycle setup: a) the threaded inserts and structural inserts are installed in an injection mold; b) the aluminum foil is then installed in the injection mold; c) finally, polymer granules are fed to the injection machine.

Step 2: Injection process: a) the melted polymer is injected into the mold; b) after injection, the product is cooled and extracted from the mold.

Step 3: Painting: The product is spray painted with one layer of topcoat.

Step 4: Soldering: a) a rear foil is soldered to the canister's rear end; b) a sealing test is performed to ensure that the soldering was performed successfully.

Step 5: Gluing and assembly: Canister parts are glued and assembled to the injected launch tube.

Step 6: Quality control: The canister passes a full quality inspection process before packing.

As will be apparent to the skilled person, the above is only one possible illustrative set of steps, and additional and/or alternative steps may be used in different setups.

Figure 6:
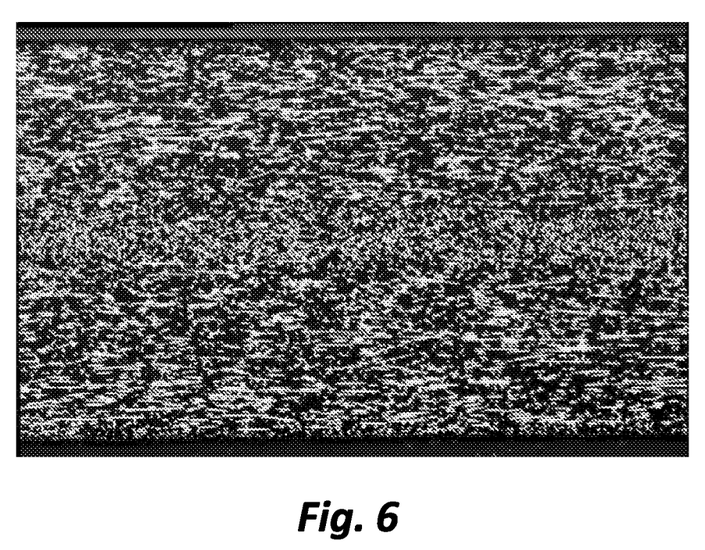
FIG. 6 is a photograph of a cross-sectional layer of a canister manufactured according to the invention.

As explained above, it is advantageous to include carbon fibers in the polymer. This results in a strengthened material, also due to the orientation of the fibers obtained during injection. FIG. 6 is a photograph of a cross-sectional layer of a canister manufactured according to the above-detailed process, from which the fibers orientation can be seen.

The canister according to the inventions was tested and was found to reduce dramatically the missile launch direction deviation, to meet Tipoff tolerance in 100% of the tests. Moreover, because in the embodiment described above the thermoplastic material consisted of polyamide with carbon fibers, the resulting layer is electrically conductive, resulting in excellent electrical properties. Additionally, because the thermoplastic layer is injected, it was found that the carbon fibers are aligned in a fashion that improves the mechanical properties of the final canister. Finally, the invention is also environmentally friendly, because the canisters made from thermoplastic materials are recyclable, as opposed to conventional thermoset canisters.

All the above description of embodiments of the invention has been provided for the purpose of illustration and is not intended to limit the invention in any way, except as provided for in the appended claims.

The invention claimed is:

1. A canister for storing and launching a self-propelled projectile, comprising:
    a) an inner layer comprising an aluminum foil;
    b) a top layer consisting of an injected thermoplastic polymer; and
    c) optionally, a primer and/or a topcoat.

2. A canister according to claim 1, further comprising a sealing aluminum membrane soldered at said canister's proximal extremity.

3. A canister according to claim 1, wherein the aluminum foil is a structure of at least three layers laminate, comprising of at least top and bottom thermoplastic polymer layer, and intermediate aluminum layer.

4. A canister according to claim 3, wherein the top and bottom layer of the laminate are in 10-100 μm thickness, and the intermediate layer is in the range of 40-280 μm.

5. A canister according to claim 3 above, wherein said aluminum layer is selected from the 1XXX series aluminum alloys.

6. A canister according to claim 1, further comprising metal inserts, configured to hold attachable components to said canister.

7. A canister according to claim 6, wherein the inserts are covered using cataphoretic coatings.

8. A canister for storing and launching a self-propelled projectile, comprising:
    a) an inner layer comprising an aluminum foil;
    b) a top layer consisting of an injected polyamide polymer and carbon fibers; and
    c) optionally, a primer and/or a topcoat.

9. A canister according to claim 8, wherein the carbon fibers are present in an amount of 30%-50% by weight of said thermoplastic polymer.

10. A canister according to claim 8, wherein the top layer polyamide polymer is a polyphthalamide polymer.

\* \* \* \* \*